United States Patent [19]

Sugiura et al.

[11] 4,268,153
[45] May 19, 1981

[54] ELECTROMAGNETICALLY DRIVEN SHUTTER
[75] Inventors: Yoji Sugiura; Masayoshi Kiuchi, both of Yokohama, Japan
[73] Assignee: Canon Kabushiki Kaisha, Tokyo, Japan
[21] Appl. No.: 161,434
[22] Filed: Jun. 20, 1980

[30] Foreign Application Priority Data

Jun. 22, 1979 [JP]  Japan .................................. 54-78949

[51] Int. Cl.$^3$ ............................................. G03B 9/08
[52] U.S. Cl. .................................................. 354/234
[58] Field of Search ...................... 354/234, 235, 246

[56] References Cited

U.S. PATENT DOCUMENTS 2,390,216  12/1945  Guedon ............................... 354/234
3,056,341  10/1962  Grey ..................................... 354/50
3,455,219   7/1969  Burgarella ....................... 354/60 X
3,638,550   2/1972  Hereford ........................... 354/234

FOREIGN PATENT DOCUMENTS 52-37428  3/1977  Japan ................................... 354/234

Primary Examiner—Donald A. Griffin
Attorney, Agent, or Firm—Toren, McGeady and Stanger

[57] ABSTRACT

A slit exposure shutter which has an electromagnetic drive source and is arranged to have shutter blades moved by rotation of a rotor not exceeding a half turn to perform exposure effecting and returning travels. The weight of the shutter blades and that of the rotor are arranged to be approximately in balance by having the rotation shaft of the rotor eccentrically disposed in a position deviating from the center of the rotor.

4 Claims, 8 Drawing Figures

ELECTROMAGNETICALLY DRIVEN SHUTTER

BACKGROUND OF THE INVENTION

1. Field of the Invention:

This invention relates to an improvement on a drive source for a slit exposure shutter in which shutter blades are arranged to be caused to travel by an electromagnetic drive.

2. Description of the Prior Art:

Advancement of application of electronics to cameras has during recent years prompted proposals of various electromagnetically driven shutters using electromagnetic driving devices adapted for use as drive sources for slit exposure shutters. Compared with the conventional mechanically driven shutter, the shutter of this type has a drive mechanism simply arranged to permit reduction in size, weight and cost of a camera and is thus highly suitable for a camera that has electronics applied thereto to an advanced extent. However, a space available within a camera for housing a power source is limited and allows the use of only a small battery of small electrical capacity. Accordingly, the electric current available from such a power source is also limited calling for a minimal power consumption and thus it is not desirable to take out a large current therefrom. An electromagnetic drive source for driving a shutter, therefore, has been required to be capable of efficiently driving shutter blades at a high speed with a small power. Further, in order to permit reduction in weight of a shutter, it has been desired to have a slit exposure type shutter arranged to drive light weight shutter blades directly with a rotary electromagnetic drive source.

In a slit exposure shutter of the type arranged to have the front and rear shutter blades driven respectively by a rotary electromagnetic drive source to perform exposure effecting and returning travels, the rotor of the electromagnetic drive source makes a reciprocative rotational movement within a preset range of rotation angle. The rotation angle does not exceed 180°. The shutter blades are caused to make an exposure effecting travel by the onward rotational movement while the return travel of the shutter blades is caused by the backward rotational movement. It is, however, possible to have the shutter blades caused to make an exposure effecting travel also by the backward rotational movement. In the device of such a type, the rotor of the drive source is under the load of the shutter blades imposed always in one direction during the reciprocative rotational movement. Such a condition necessitates a flow of a large driving current to the drive source in order to drive such a load.

SUMMARY OF THE INVENTION

The present invention is directed to the solution of the above stated problem. It is therefore a general object of the invention to provide a slit exposure shutter having a rotary electromagnetic drive source which is of an improved efficiency and is capable of driving shutter blades at a high speed with small amount of power.

In the slit exposure shutter of the present invention, the rotor of the electromagnetic drive source is eccentrically positioned relative to the axis of rotation in such a way as to have the weight of the rotor and that of the shutter blades always balanced with each other. This eccentric state can be obtained not only by eccentric figuration but also by offset arrangement of weight. With the drive source arranged in this manner, the shutter blades can be driven by a relatively small output of the drive source. Accordingly, a small amount of power supply suffices so that a highly efficient electromagnetic drive source can be obtained for driving the shutter of a camera.

The above and further objects and features of the invention will become apparent from the following detailed description of embodiments thereof taken in connection with the accompanying drawings.

DETAILED DESCRIPTION OF PREFERRED EMBODIMENTS

Figure 1:
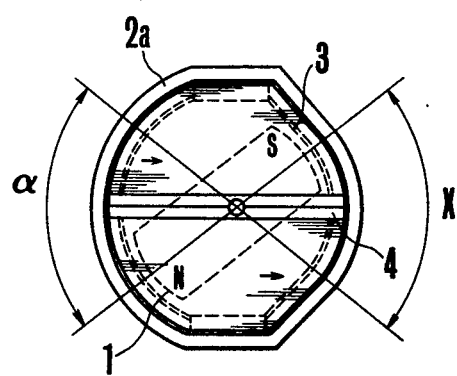
FIG. 1 is a plane view showing an electromagnetic drive source to be used for an electromagnetically driven shutter as an embodiment of the invention.
Figure 2:
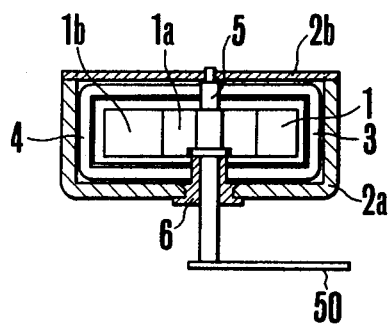
FIG. 2 is a sectional view taken on line A—A.

In FIGS. 1 and 2 which show a rotary magnet type electromagnetic drive source as an embodiment of the invention, a rotor 1 consists of a permanent magnet which is magnetized as shown in FIG. 1 with a rotation shaft 5 secured to the rotor at a point deviating from the center of the rotor as shown. A casing is formed by a yoke 2 which is provided with a bottom 2a of the casing and a cover 2b. A field coil 3 is wound round a bobbin 4 and is secured to the casing 2. The shaft 5 is rotatably supported by a bearing 6.

The electromagnetic drive source which is arranged as described in the foregoing has the casing thereof secured to a shutter base plate which is not shown. The short diameter side of the rotation shaft 5 engages with shutter blades which are also not shown. Meanwhile, a drive member 50 which is arranged to drive the shutter blades is secured to the rotation shaft 5.

The device shown in FIGS. 1 and 2 operates in the following manner: These drawings show the device as in a state prior to the start of the travel of the shutter blades. Under this condition, when a current is allowed to flow to the field coil 3 of the stator in the direction of arrows, the magnetic flux of the field coil of the stator causes the rotor 1 to rotate clockwise. The rotor rotates to the extent of a predetermined angle $\alpha$ and then is brought to a stop by a stopper mechanism which is not shown. This rotation movement of the rotor 1 is transmitted to the shutter blades through the rotation shaft 5 and the drive member 50 to cause the shutter blades to travel. The rotor 1 is eccentrically mounted on the shaft and a mechanism for transmitting a rotating force to the shutter blades is arranged such that it has its point of application located on the light-weight side (or shorter diameter side) of the rotor. Therefore, a shutter blade drive mechanism is then moved to an extent X as shown in FIG. 1 to cause the shutter blades to travel accordingly. As shown, with the shaft arranged to eccentrically support the rotor 1 and with the load of shutter blades imposed on the shorter diameter side of the rotor, when the rotor is allowed to rotate within a predetermined range of angle (about 80° in the case of the drawing), the loads of the longer diameter side and shorter diameter side of the rotor can be balanced with each other. With this arrangement, the whole moving part including the rotor and the shutter blade loading mechanism is approximately balanced in weight as long as the rotative movement is performed within the above stated rotation angle range. This enables the electromagnetic drive source to operate most efficiently to minimize the driving power requirement. Besides the drive source can be operated either in the vertical or transverse directions without bringing about any adverse effect thereof. An extremely efficient electromagnetically driven slit exposure shutter can be obtained by providing each of the front and rear shutter blades with the above stated electromagnetic drive source and by allowing these shutter blades to make exposure effecting and returning travels within a predetermined rotation angle range of the rotation shaft of each of the drive sources (not exceeding 180°) in a reciprocative manner. Further, it is possible to also effect an exposure by the return travel of the shutter blades instead of resetting the shutter by the return travel.

Figure 3:
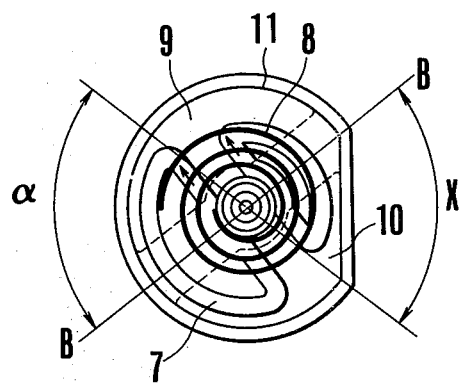
FIG. 3 is a plane view showing a rotary coil type structure of an electromagnetic drive source as another embodiment of the invention.
Figure 4:
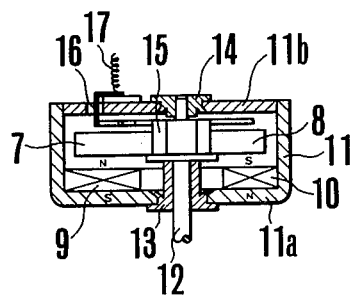
FIG. 4 is a sectional view of the embodiment shown in FIG. 3.

FIGS. 3 and 4 show a rotary coil type electromagnetic drive source as another embodiment of the invention, FIG. 3 being a plan view and FIG. 4 a sectional view taken on line B—B of FIG. 3. In the embodiment thus illustrated, a rotor is formed by flat type coils 7 and 8 which are secured to a rotation shaft 12 through an insulation collar 15. The coils 7 and 8 differ from each other in size and weight and are disposed across the shaft 12 on opposite sides thereof. A drive member 50 which is identical with the corresponding member in the preceding embodiment example is secured to the lower part of the shaft 12 on the same side as the above stated coil 8. This embodiment further comprises a yoke 11; the bottom part 11a and the cover part 11b of the yoke 11; permanent magnets 9 and 10 which are secured to the yoke 11; a hair spring 16 which is arranged to supply a current to the coils 7 and 8; and a power supply lead wire 17. The electromagnetic drive source thus being composed of the arcuate permanent magnets and the flat rotary coils, the shutter blades are ready for travelling when the rotary coils 7 and 8 are in positions perpendicular to the magnets 9 and 10 as shown in FIG. 3. Under this condition, when a current is allowed to flow to the coils 7 and 8 in the direction of arrow marks, the relation of the magnetic fluxes from the coils 7 and 8 to the magnets 9 and 10 causes the rotor to which the coils 7 and 8 are secured to rotate clockwise on the rotation shaft 12. The rotor rotates to a predetermined extent within the angle range of 180°. The rotation force of the rotor is transmitted to the shutter blades through the shaft 12. Then, the shutter blades travel to effect an exposure and are brought to a stop by a stopper mechanism which is not shown. The rest of the operation is identical with the magnet rotating type shown in FIGS. 1 and 2 and, therefore, is omitted from description here. As shown in FIGS. 3 and 4, the rotary coils 7 and 8 differ from each other in size and weight while the field magnets 9 and 10 also differ from each other in size. The electromagnetic drive source which is of the above stated eccentric structural arrangement is capable of driving the shutter blades to travel with a high degree of efficiency in the same manner as in the preceding example of embodiment.

Figure 5:
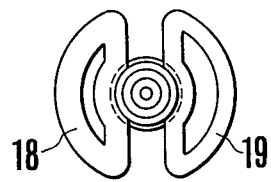
FIGS. 5 and 6 are plane views showing, as further embodiments, modifications of the coil part of the rotary coil type electromagnetic drive source shown in FIG. 4.
Figure 6:
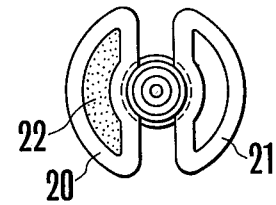

FIGS. 5 and 6 show the structures of rotary coils used in rotary coil type electromagnetic drive sources as further embodiments of the invention. In the embodiment shown in FIG. 5, the rotor is not eccentrically arranged as in the case of FIGS. 3 and 4 but the left and right coils 18 and 19 of the rotor are arranged to have different numbers of winding turns from each other to let them have different weights and sizes in such a way as to have the rotor in balance with the load of the shutter blades thereon. Meanwhile, in the case of FIG. 6, the balance is obtained by adding a weight 22 to the bobbin of a coil 20 while two coils 20 and 21 are arranged to have the same number of winding turns. Since the rotor in each of these embodiments is arranged to be of the same shape as the ordinary non-eccentric rotor, the structure of the stator can be simplified.

Figure 7:
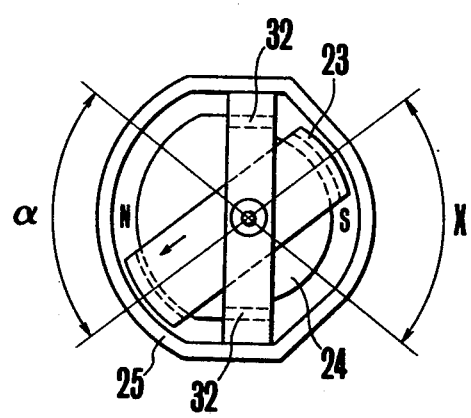
FIG. 7 is a plane view showing a still further embodiment of the invention.
Figure 8:
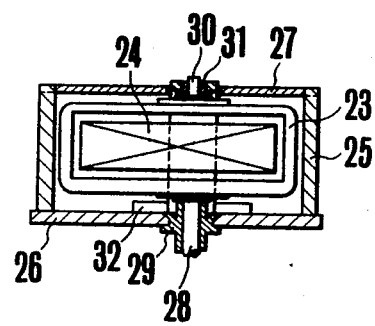
FIG. 8 is a sectional view of the embodiment shown in FIG. 7.

A further embodiment of the invention is as shown in FIG. 7 which is a plan view and FIG. 8 which is a sectional view. The drive source of this embodiment is of a rotary coil type having both a rotary coil and a stator magnet eccentrically arranged. In this embodiment, a stator is formed with a yoke 25; a base plate 26; an upper lid 27; a magnet 24 which is enclosed with these parts; and a magnet support 32 which have the magnet secured thereto. A coil 23 forms a rotor and has rotation shafts 28 and 30 secured thereto. The rotation shafts 28 and 30 are rotatably supported by bearings 29 and 31 which are disposed on the base plate and the upper lid of the stator. The above stated drive member 50 is secured to the lower part of the shaft 28. This embodiment operates in the same manner as in other embodiments described in the foregoing. Therefore, the operation of it is omitted from description here. With the electromagnetic drive source arranged with the eccentric coil and magnet as shown in FIGS. 7 and 8, it goes without saying that the effect of the eccentric arrangement may be furthered by adding a weight to the coil part.

As described in each of the embodiments, the invented electromagnetically driven shutter is arranged such that, in driving the shutter blades to travel by rotating the rotary electromagnetic drive source to an extent of a predetermined angle, the unbalance between the left and right sides of a rotation shaft due to the load imposed on a rotor by shutter blades is eliminated by weight balancing effected by eccentric arrangement or other methods. By this arrangement, the electromagnetically driven shutter can be operated with high efficiency with a small power, so that the shutter can be operated advantageously with a power source of small capacity power source such as the one used in a camera.

What is claimed is:

1. An electromagnetically driven slit exposure shutter comprising:
   a rotary electromagnetic drive source; and
   shutter blades with are mounted on the rotation shaft of said electromagnetic drive source and are arranged to travel by an electromagnetic force for effecting an exposure and for returning to the original position thereof, a rotor of said electromagnetic drive source being mounted on said rotation shaft to have the center of gravity thereof located on one side opposite to said shutter blades relative to said rotation shaft, said rotor being arranged to rotate to an extent not exceeding a half turn for causing the shutter blades to travel.

2. A slit exposure shutter according to claim 1, wherein said rotor is a permanent magnet.

3. A slit exposure shutter according to claim 1, wherein said rotor is a field coil.

4. A slit exposure shutter according to claim 3, wherein said rotor includes two coils of different sizes one being disposed on the same side as said shutter blades and the other being disposed on a side opposite to said shutter blades.

* * * * *